H. W. PLEISTER AND J. KARITZKY.
CABLE CLAMP AND BRIDLE RING.
APPLICATION FILED AUG. 17, 1920.
1,365,626.
Patented Jan. 11, 1921.
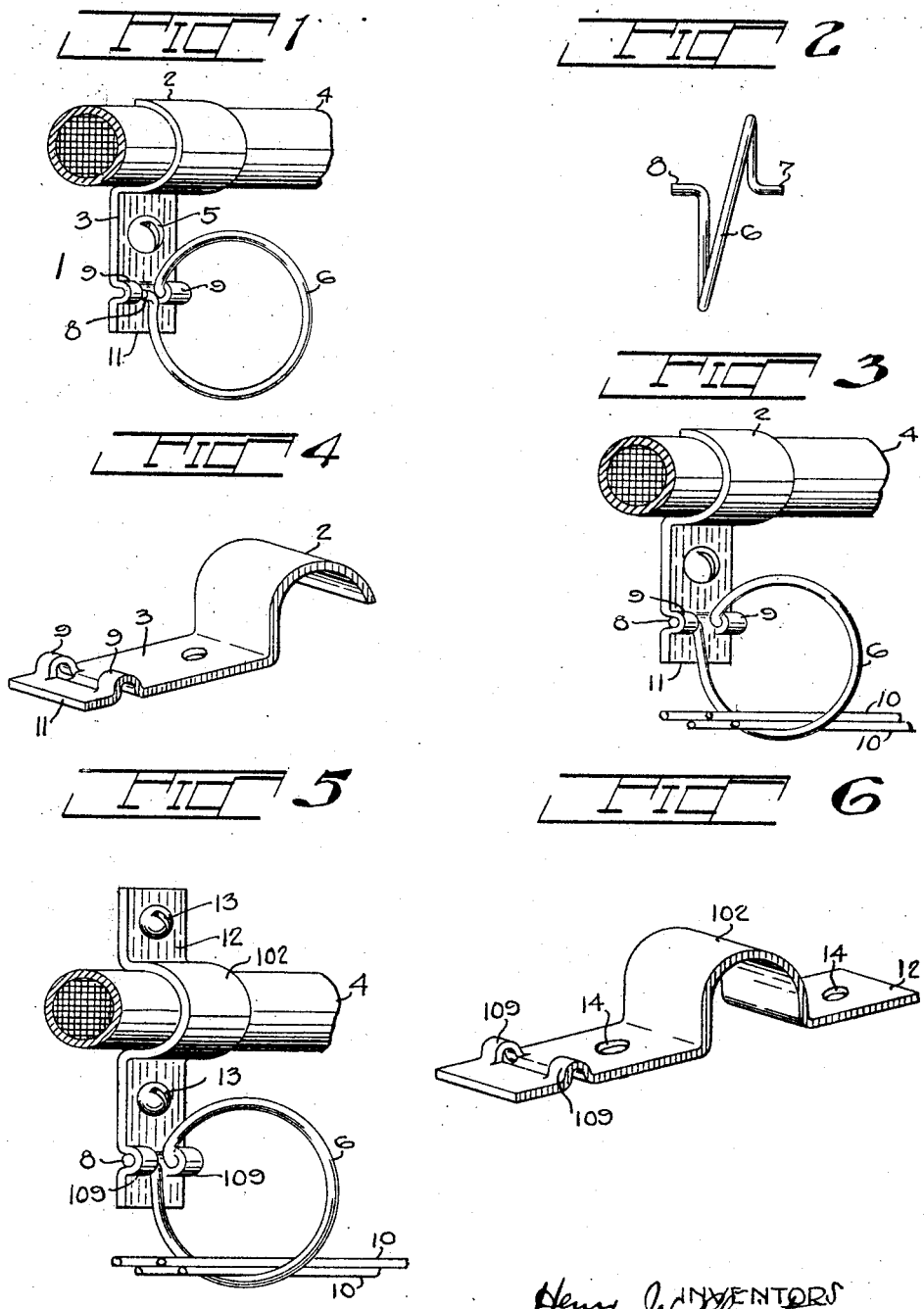

UNITED STATES PATENT OFFICE.

HENRY W. PLEISTER, OF WESTFIELD, AND JOHN KARITZKY, OF GARWOOD, NEW JERSEY, ASSIGNORS TO HENRY B. NEWHALL, EXECUTOR OF HENRY B. NEWHALL, SR., DECEASED.

CABLE-CLAMP AND BRIDLE-RING.

1,365,626.      Specification of Letters Patent.      Patented Jan. 11, 1921.

Original application filed October 4, 1919, Serial No. 328,530. Divided and this application filed August 17, 1920. Serial No. 404,164.

*To all whom it may concern:*

Be it known that we, HENRY W. PLEISTER, a citizen of the United States, residing at Westfield, in the county of Union and State of New Jersey, and JOHN KARITZKY, a citizen of the United States, residing at Garwood, in the county of Union and State of New Jersey, have invented certain new and useful Improvements in Cable-Clamps and Bridle-Rings, of which the following is a specification, taken in connection with the accompanying drawings.

This application is a division of our parent application Ser. No. 328530, filed October 4th, 1919.

Our invention relates to a combined conduit and cable clamp and bridle ring, and also to the cable or conduit clamp as a sub-combination or article of manufacture.

Our invention further relates to a cable and conduit clamp which can be manufactured at minimum expense and to which a bridle ring may be secured either at the original installation of the cable and conduit clamp, or at any future time when it may be desirable to support one or more runs of bridle wire. It further relates to the combination of a conduit and cable clamp and a bridle ring which is unthreaded, and which will form a complete closed loop around the bridle wire or strands of bridle wires, and thereby prevent any accidental disengagement of the bridle wire from the bridle ring.

Our invention further relates to certain combinations, sub-combinations, articles of manufacture, and details of construction all of which will be more fully hereinafter described and pointed out in the claims.

In the figures, in which we have shown different embodiments of our invention, the same reference numerals refer to similar parts in the several figures.

Figure 1 is a perspective view of our combined cable clamp and bridle ring, the bridle ring being shown in its first attaching position.

Fig. 2 is a perspective view of the preferred form of bridle ring.

Fig. 3 is a perspective view, similar to Fig. 1, but showing the bridle ring fully attached to the conduit or cable clamp and supporting runs of bridle wires.

Fig. 4 is a perspective view of the conduit or cable clamp.

Fig. 5 is a perspective view of a modified form of two hole conduit or cable clamp, and bridle ring with rings of bridle wires supported by the bridle ring.

Fig. 6 is a perspective view of the conduit or cable clamp shown in Fig. 5.

Previous to our invention bridle rings have been used with conduit and cable clamps. These bridle rings are what are known as "pig-tail", having one of their ends provided with machine screw threads to coöperate with machine female screw threads in the heel of the cable clamp. This has necessitated an extra thickness of metal in the heel of the conduit or cable clamp so as to provide sufficient female threads to support the shank of the commercial pig-tail bridle ring. When the cable clamp was formed of sheet metal the customary way to get this additional thickness of metal in the heel was to bend over sufficient additional metal to double the thickness of the metal in the heel. This necessitated the use of a large additional quantity of sheet metal with the consequent increase in cost of the resulting cable or conduit clamp.

In the commercial use of conduit and cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By our invention our conduit and cable clamp may be used as a separate article of manufacture or sub-combination, and then later, when the needs of the service demand it, our bridle ring may be supported by the same conduit or cable clamp, when the complete combination would be used.

By our invention we form our cable clamp 1 preferably of sheet metal and provide it with a hook 2 and heel 3, both of the same minimum thickness, so as to reduce the cost of manufacture.

The cable and conduit clamp 1 is used to support the cable 4 in the ordinary manner against a wall or other support by the securing screw 5. Weeks, months, or years later, when it may be desirable to increase the service by stringing additional wires, this may be accomplished at minimum expense by our invention, by attaching our bridle ring 6, having the arms 7, 8 to the bearings, 9, 9 of the conduit or cable clamp 1. This can be easily done by placing the arm 7 in one of the bearings 9, for example, and then compressing the bridle ring 6 so that the other arm 8 will spring into the other bearing 9, as shown in Fig. 1. The bridle wires 10, 10 can then be strung through the bridle ring 6, Fig. 3. The bearings 9, 9 are preferably formed at a point removed from the end 11 of the heel or base 3. They are preferably formed by cutting or slotting the heel or base, at a point removed from the end 11, and bending the metal so cut, as shown in Figs. 1, 3 and 4.

Our invention can also be used as a two-hole conduit or cable clamp. In Figs. 5 and 6 we have shown a two-hole conduit or cable clamp 12, having a hook portion 102 supporting the cable 4. This clamp is secured in position by the two screws 13, 13 passing through the two holes 14, 14.

This two-hole conduit or cable clamp is provided with bearings 109, 109 formed in the same manner as the bearings 9, 9 of the other construction.

It will be noted that in our improved construction there is but one minimum thickness of metal in the heel of the conduit or cable clamp; that no tapping or screw threading of the heel is required; that no screw threads on the bridle ring are necessary or desirable; that much thinner and lighter wire can be used to form our bridle ring than can be used in the ordinary commercial form of pig-tail bridle ring; and that a closed loop is formed around the strands of bridle wires so that they cannot become disengaged from the bridle ring; and that our bridle ring can, in both of our forms shown, be attached to the different conduit or cable clamps without loosening the securing screw and by simple manipulation.

Having thus described this invention in connection with illustrative embodiments thereof, to the details of which we do not desire to be limited, what is claimed as new and what is desired to secure by Letters Patent is set forth in the appended claims:

1. A conduit and cable clamp formed of sheet metal having a hook portion and a heel portion of one thickness of metal the heel portion being provided with two vertical cuts or kerfs and the metal of the heel portion being bent from the cuts or kerfs to the edge of the heel portion to form two horizontal bearings for both ends of a bridle ring.

2. A conduit and cable clamp formed of sheet metal having a hook portion and a heel portion of one thickness of metal, the heel portion being provided at a point removed from its end with two bearings horizontally alined with space between said bearings to receive two ends of a coöperating spring bridle ring and a coöperating spring bridle ring having two oppositely extending horizontal arms adapted to be sprung into said horizontal bearings.

HENRY W. PLEISTER.
JOHN KARITZKY.

Witnesses:
MARY R. RYAN,
ELIZABETH J. ROTH.